(12) United States Patent
Sweppy et al.

(10) Patent No.: US 8,984,934 B2
(45) Date of Patent: Mar. 24, 2015

(54) METHOD AND SYSTEM TO VALIDATE A FUEL LEVEL INDICATOR IN A VEHICLE

(71) Applicant: Ford Global Technologies, LLC, Dearborn, MI (US)

(72) Inventors: Michael Stephen Sweppy, Manchester, MI (US); Robert Roy Jentz, Westland, MI (US); Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 126 days.

(21) Appl. No.: 13/799,262

(22) Filed: Mar. 13, 2013

(65) Prior Publication Data

US 2014/0260576 A1 Sep. 18, 2014

(51) Int. Cl.
G01M 17/00 (2006.01)
G01F 22/00 (2006.01)
G01F 23/32 (2006.01)
G01F 25/00 (2006.01)

(52) U.S. Cl.
CPC ............... *G01F 22/00* (2013.01); *G01F 23/32* (2013.01); *G01F 25/0061* (2013.01); *G01F 25/0069* (2013.01)
USPC ..................................................... 73/114.54

(58) Field of Classification Search
CPC ......... G01F 22/00; G01F 22/02; G01F 23/14; G01F 25/0061; G01F 25/0069
USPC ................ 73/114.38, 114.52, 114.53, 114.54
See application file for complete search history.

(56) References Cited

U.S. PATENT DOCUMENTS

| | | | |
|---|---|---|---|
| 5,379,638 A * | 1/1995 | Denz et al. ....................... 73/291 |
| 5,398,662 A | 3/1995 | Igarashi et al. |
| 5,652,393 A | 7/1997 | Lawson |
| 5,886,625 A | 3/1999 | Uto et al. |
| 6,282,953 B1 * | 9/2001 | Benjey ............................. 73/438 |
| 6,907,780 B1 * | 6/2005 | Meagher ......................... 73/299 |
| 7,210,341 B2 * | 5/2007 | Fuse ............................... 73/149 |
| 7,343,797 B2 * | 3/2008 | Bremmer et al. .............. 73/299 |
| 2002/0100314 A1 * | 8/2002 | Docy et al. ..................... 73/49.2 |
| 2004/0204870 A1 * | 10/2004 | Schimnowski et al. ......... 702/45 |
| 2010/0145638 A1 * | 6/2010 | Begin .............................. 702/55 |
| 2010/0185360 A1 * | 7/2010 | Windbergs et al. ............. 701/34 |

* cited by examiner

*Primary Examiner* — Eric S McCall
(74) *Attorney, Agent, or Firm* — James Dottavio; Brooks Kushman P.C.

(57) ABSTRACT

A vehicle is provided with a controller and a fuel system having a fuel tank, a fuel level indicator (FLI), and a pressure sensor. The controller is configured to: pull a vacuum on the tank from an initial pressure to a reference pressure, and provide a diagnostic code in response to comparing a fuel level indicated by the FLI to a rate of pressure change in the tank. A method for performing a fuel level indicator (FLI) diagnostic for a vehicle is provided. A vacuum is pulled on the fuel tank from an initial pressure to a reference pressure. A diagnostic code is provided in response to comparing a fuel level indicated by an FLI to a rate of pressure change.

16 Claims, 5 Drawing Sheets

| | dP/dt | Inferred Fuel Level |
|---|---|---|
| (Large) | $X_1$ | 100% |
| ↓ | $X_2$ | 75% |
|  | $X_3$ | 50% |
|  | $X_4$ | 25% |
| (Small) | $X_5$ | 0% |

FIG. 4

| Cluster Gauge | FLI1 | FLI2 | Conclusion with FLI1/FLI2 Only | Inferred Fill Level | Conclusion with FTPT dP/dt |
|---|---|---|---|---|---|
| 100 | High | High | Plausible | High | Pass |
| 50 | High | Low | Plausible Without FTPT Data | High | FLI2 Incorrect with FTPT Data |
| 50 | Low | High | Not Plausible** | High | FLI1 Incorrect with FTPT Data |
| 0 | Low | Low | Plausible | High | Both FLI1/FLI2 or FTPT Incorrect |
| 100 | High | High | Plausible | Low | Both FLI1/FLI2 or FTPT Incorrect |
| 50 | High | Low | Plausible Without FTPT Data | Low | FLI1 Incorrect with FTPT Data |
| 50 | Low | High | Not Plausible** | Low | FLI2 Incorrect with FTPT Data |
| 0 | Low | Low | Plausible | Low | Pass |

METHOD AND SYSTEM TO VALIDATE A FUEL LEVEL INDICATOR IN A VEHICLE

TECHNICAL FIELD

Various embodiments relate to diagnostics for a fuel level indicator for a fuel tank connected to an internal combustion engine.

BACKGROUND

Vehicles have a fuel system to store and deliver fuel, such as gasoline, diesel, or the like, to an internal combustion engine. The fuel system has a fuel tank and a fuel level indicator (FLI) that senses the fuel level in the fuel tank. A fuel gauge is in communication with the fuel level indicator to provide information regarding the amount of fuel in the fuel tank to a user of the vehicle. The functionality of the fuel level indicator may need to be verified.

SUMMARY

In an embodiment, a vehicle is provided with an engine, a fuel system for the engine, and a controller. The fuel system has a fuel tank, a first fuel level indicator (FLI), and a pressure sensor. The controller is configured to: (i) pull a vacuum on the fuel tank from an initial pressure to a reference pressure while operating a timer to determine a rate of pressure change in the fuel tank, and (ii) provide a diagnostic code in response to comparing a fuel level indicated by the FLI to an inferred fuel level based on the rate of pressure change.

In another embodiment, a vehicle is provided with a controller and a fuel system having a fuel tank, a fuel level indicator (FLI), and a pressure sensor. The controller is configured to: (i) pull a vacuum on the fuel tank from an initial pressure to a reference pressure while operating a timer to determine a rate of pressure change in the fuel tank, and (ii) provide a diagnostic code in response to comparing a fuel level indicated by the FLI to an inferred fuel level, the inferred fuel level correlated with the rate of pressure change.

In yet another embodiment, a method for performing a fuel level indicator (FLI) diagnostic for a vehicle is provided. A vacuum is pulled on the fuel tank from an initial pressure to a reference pressure while a timer is operated to determine a rate of pressure change in the fuel tank. A diagnostic code is provided in response to comparing a fuel level indicated by an FLI to the rate of pressure change.

Various embodiments of the present disclosure have associated, non-limiting advantages. For example, pressure testing the fuel tank to correlate a rate of pressure change within the fuel tank to a fuel level within the tank allows for a diagnostic to determine whether a fuel level indicator within the fuel tank is functional. The diagnostic may be used at any fill level of fuel in the fuel tank. When the fill level of fuel in the fuel tank is within a ullage region or an empty region when the FLI positions are at their respective limits, the diagnostic may determine if the FLI(s) are functioning properly when there is no change in measured fuel level by the FLI(s).

DETAILED DESCRIPTION

As required, detailed embodiments of the present disclosure are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
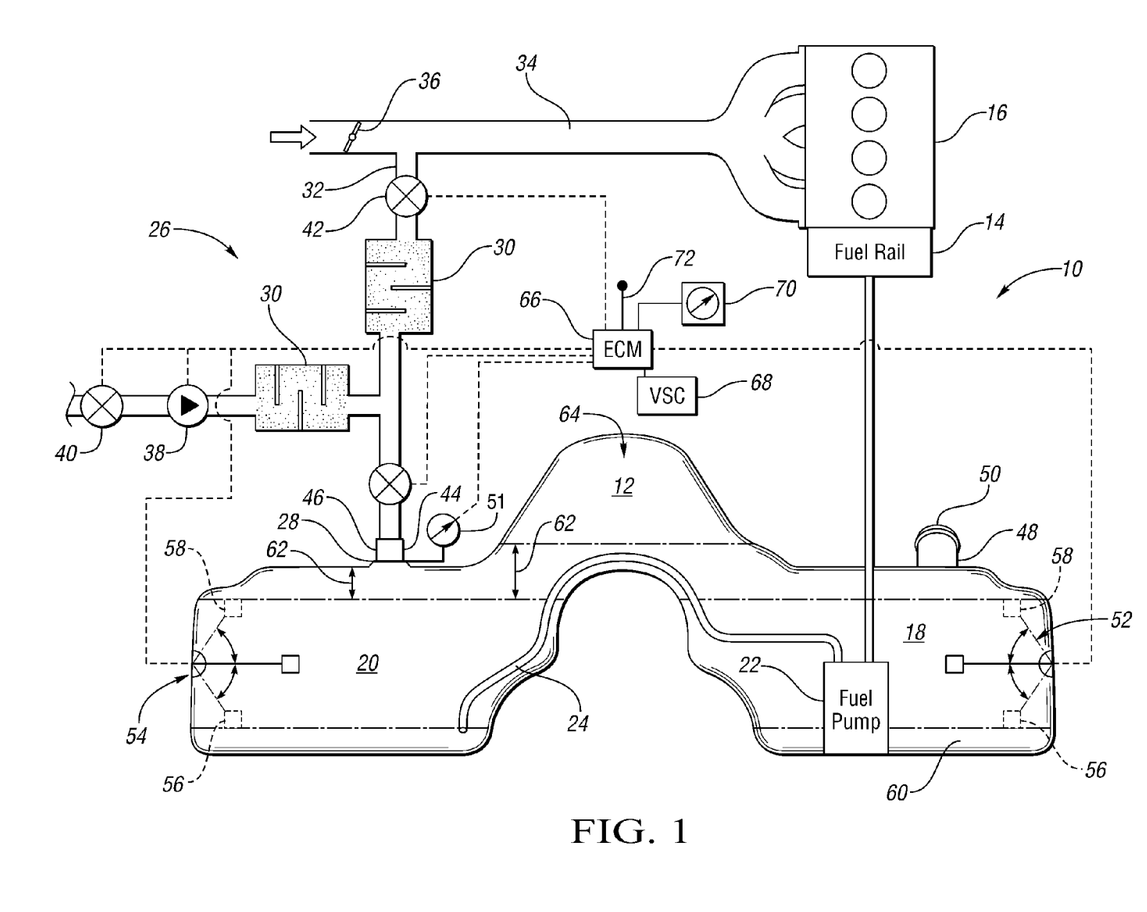
FIG. 1 illustrates a fuel system for a vehicle according to an embodiment.

A fuel system 10 is shown in FIG. 1. The fuel system 10 has a fuel tank 12 to provide fuel to a fuel rail 14 or other fuel delivery system for an engine 16. The fuel tank 12 is illustrated as a saddle tank having a first side 18 and a second side 20. As shown in FIG. 1, the first side 18 is the active side and the second side 20 is the passive side. Although the fuel tank 12 is illustrated as a saddle tank, various embodiments may include other fuel tank architectures, such as a conventional single tank system.

The active side 18 of the fuel tank 12 contains a fuel pump 22 that pumps and provides fuel to the fuel rail 14. The pump 22 has a fluid line, such as a hose 24, that extends into the passive side 20 of the fuel tank 12. When the pump is operating, the hose 24 acts as a jet pump in the passive side 20 and causes fuel from the passive side 20 to flow into the active side 18 of the fuel tank 12. When the fuel tank 12 is nominally full both the active and passive sides 18, 20 are full. As fuel is used and the pump 22 is operating, the fuel level in the passive side 20 decreases and the active side 18 remains full due to the fuel being jetted to the active side 18 via hose 24. Once the passive side 20 has been emptied, the fuel level then begins to decrease in the active side 18. When the pump 22 is not operating, fuel is not being pumped from the passive side 20 to the active side 18, and the fuel levels in the active and passive sides 18, 20 will equilibrate from fuel backflowing from the active side 18 to the passive side 20. For example, when the fuel tank 12 is half full of fuel, the active side 18 is full and the passive side 20 is empty when the fuel pump 22 is operating, and both sides 18, 20 are half full when the fuel pump 22 is not operating. When the fuel pump 22 is started or stopped, there may be an associated time. e.g. on the order of minutes, for the fuel levels in the tank 12 to reach a steady state or quasi-steady state between the two sides 18, 20.

The fuel system 10 also has a vapor purge system (VPS) 26 having a fuel vent 28 connected to one or more carbon canisters 30 to prevent fuel vapors from entering the atmosphere. The carbon canisters 30 are filled with activated carbon or another like material to adsorb fuel vapors. As gases containing fuel vapor pass through the bed of carbon, the fuel vapor is adsorbed by the carbon pellets. The VPS 26 has a recovery port 32 connecting the canisters 30 to an intake 34 of the engine 16. The VPS 26 also has a vent port 36 communicating to the atmosphere. When gases exit carbon canisters 30 through vent port 36, all, or substantially all, of the fuel vapor displaced from the fuel tank 12 is adsorbed by contact with the carbon pellets within the canisters 30.

The VPS 26 may be used during a fueling operation, when the vehicle is parked and daily (diurnal) temperature variations cause lower molecular weight components of the fuel to vaporize during the heat of the day, and the like. The activated carbon of the canisters 30 have a limited ability to store fuel and, therefore, the adsorbed fuel vapor is periodically purged from the activated carbon so that it can adsorb fuel vapor displaced from fuel tank 12. During the purge process, fresh air is pulled from the atmosphere through the carbon pellets within canisters 30, and inducted through recovery port 32 into the engine intake 34 downstream of a throttle 36 and to an operating internal combustion engine 16, where they are combusted.

The vapor purge system 26 has a pump 38 that may be used to pump vapor from the VPS 26 to atmosphere, or to pull a vacuum on the fuel tank 12 and/or vapor purge system 26. In one embodiment, the pump 38 may be incorporated into a diagnostic system for pressure testing the vapor purge system or fuel system for system integrity. A canister vent valve (CVV) 40 is positioned between the pump 38 and atmosphere. A canister purge valve (CPV) 42 is positioned between a canister 30 and port 32. A fuel tank isolation valve (FTIV) 44 is positioned between a canister 30 and the vent port 28. In one example, the FTIV 44 is a shutoff valve having on/off positions, and the CPV 42 and the CVV 40 are range valves. Alternatively, the FTIV 44, CVV 40, and CPV 42 may have a range of flow control or be on/off valves.

The vent port 28 may be equipped with a one way valve 46, such as a float valve, that prevents liquid from exiting the fuel tank 12 to the VPS 26. The fuel tank 12 has a fill line 48 for a user to add fuel to the fuel tank 12. The fill line 48 may be equipped with a one way valve 50, such as a float valve, that prevents liquid from exiting the fuel tank 12.

The fuel tank 12 has a pressure sensor 51 to measure the pressure of the vapor in the fuel tank 12. The pressure sensor 51 may be an absolute pressure sensor or a gauge pressure sensor. An absolute pressure sensor provides a pressure measurement that is referenced against a perfect vacuum, so it is equal to gauge pressure plus atmospheric pressure. A gauge or differential pressure sensor is referenced against ambient air pressure, so it is equal to absolute pressure minus atmospheric pressure.

The fuel tank 12 has a first fuel sensor 52, or fuel level indicator (FLI), in the active side 18 of the fuel tank 12. A second fuel level sensor 54 or fuel level indicator (FLI) is positioned in the passive side 20 of the fuel tank 12. The FLIs 52, 54 may be float sensors, or other liquid level sensor types as are known in the art. There may be requirements for the fuel level indicators 52, 54 of the fuel system 10, to be periodically tested onboard the vehicle to check for sensor functionality.

Each FLI 52, 54 measures between an empty position 56 (shown in phantom) and a full position 58 (shown in phantom). The FLIs 52, 54 are positioned in the fuel tank 12 such that there is a, "empty" volume 60 of fuel remaining in the fuel tank 12 when there an empty position reading 56 from the FLIs 52, 54. The empty volume 60, or the fuel remaining in the fuel tank 12 when there is an empty position reading from the FLIs 52, 54, may be on the order of three gallons or twenty percent of the total tank 12 volume according to one embodiment, although other fuel amounts are also envisioned. The fuel tank 12 has a volume above that indicated by a full position reading from the FLIs 52, 54, and this volume includes both the ullage 62 and vapor dome 64. When a user fills the fuel tank 12, the tank 12 may be filled past the full level 58 indicated by the FLIs 52, 54 such that the ullage 62 is filled or partially filled. The ullage 62 volume may be approximately three gallons or twenty percent of the total volume of the fuel tank 12 according to one embodiment, although other volumes are also anticipated.

Therefore, when a FLI 52, 54 provides a full reading 58, the volume of fuel in the tank may be anywhere from the full position 58 of the FLI to the top of the ullage 62. Similarly, when the FLI 52, 54 provides an empty reading 56, the volume of fuel in the fuel tank 12 may be anywhere between the empty position 56 of the FLI to the bottom of the empty region 60 of the fuel tank 12. It may be difficult to determine if one or both of the FLIs 52, 54 are functioning properly based on changing fuel levels due to the FLI 52, 54 not changing position when the fuel level in the tank 12 is within the ullage region 62 or empty region 60.

An electronic control module (ECM) 66, or controller, is in communication with the pump 38, valves 40, 42, 44, pressure sensor 51, and FLIs 52, 54. The ECM 66 is also in communication with a vehicle system controller (VSC) 68. The ECM 66 communicates with the VSC 68 to provide FLI 52, 54 sensor data to control a fuel level gauge visible to the user, for example as a gauge in an instrument panel. The ECM 66 may also be in communication with an ambient pressure sensor 70, and an ambient temperature sensor 72. The ambient pressure sensor 70 may be an absolute pressure sensor or a gauge pressure sensor.

Figure 2:
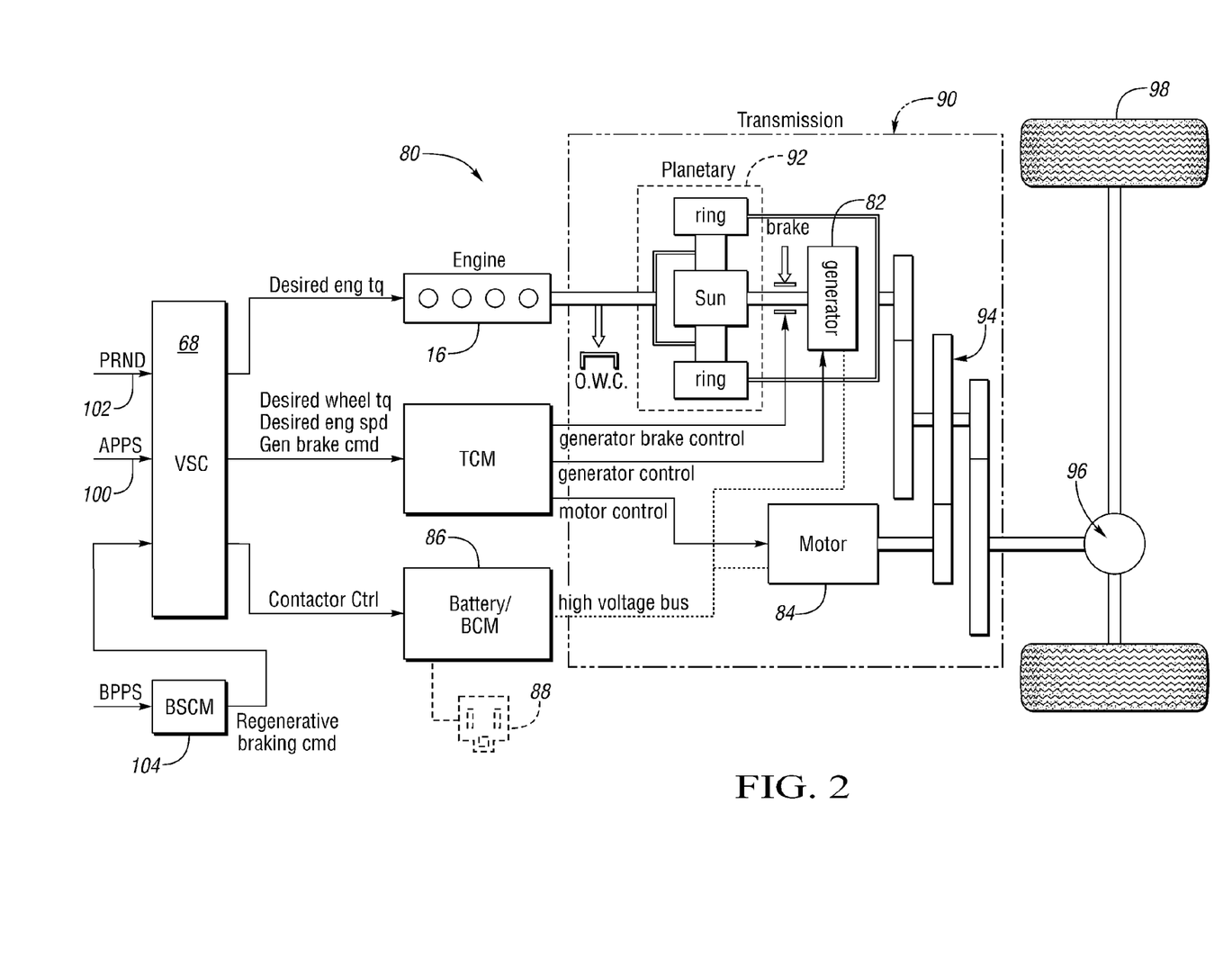
FIG. 2 illustrates a vehicle of an embodiment of an HEV for use with the fuel system according to the present disclosure.

FIG. 2 illustrates an embodiment of a hybrid electric vehicle (HEV) 80 that may be used with the fuel system 10 of the present disclosure. Of course, FIG. 2 represents only one type of HEV architecture, and is not intended to be limiting. The present disclosure may be applied to any suitable HEV. Furthermore, the present disclosure may be applied to any conventional vehicle that includes an engine.

Engine 16 is a primary power source in the HEV 80 configuration of FIG. 2. A secondary power source is a combination of a generator 82, an electric motor 84, and a battery and battery control module 86. The components of the combination are electrically coupled by an electrical high voltage bus. In some embodiments, the battery 86 is additionally rechargeable in a plug-in hybrid electric vehicle (PHEV) configuration using a receptacle 88 connected to the battery 86, possibly through a battery charger/converter unit. The receptacle 88 may be connected to the power grid or other outside electrical power source to charge the battery 86.

The powertrain includes a transmission 90. In one embodiment, the transmission 90 includes a planetary gear unit 92, the generator 82 and the motor 84, as well as torque transfer counter shaft gearing 94. The planetary gear unit 92 comprises a ring gear, a sun gear, a planetary carrier and planet gears rotatably supported on the planetary carrier for engagement with the ring gear and the sun gear. A power output gear element of the gearing 94, is driveably connected to a differential-and-axle assembly 96, which distributes power to vehicle traction wheels 98.

An overall controller for the operating modes of the powertrain may be implemented by a vehicle system controller (VSC) 68, or controller, that receives various inputs including driver inputs at 100, 102, and 104. The input at 100 is an accelerator pedal position sensor signal (APPS) and the input at 102 is driver selection for "park," "reverse," "neutral" or "drive range" (PRND). The input at 104 is from the braking system control module that receives a signal from the brake pedal position sensor. The VSC 68 may be integrated with the controller 66 of FIG. 1, or alternatively, the VSC 68 and controller 66 may be implemented by separate modules in communication with one another or be part of a controller area network (CAN) bus.

Figure 3:
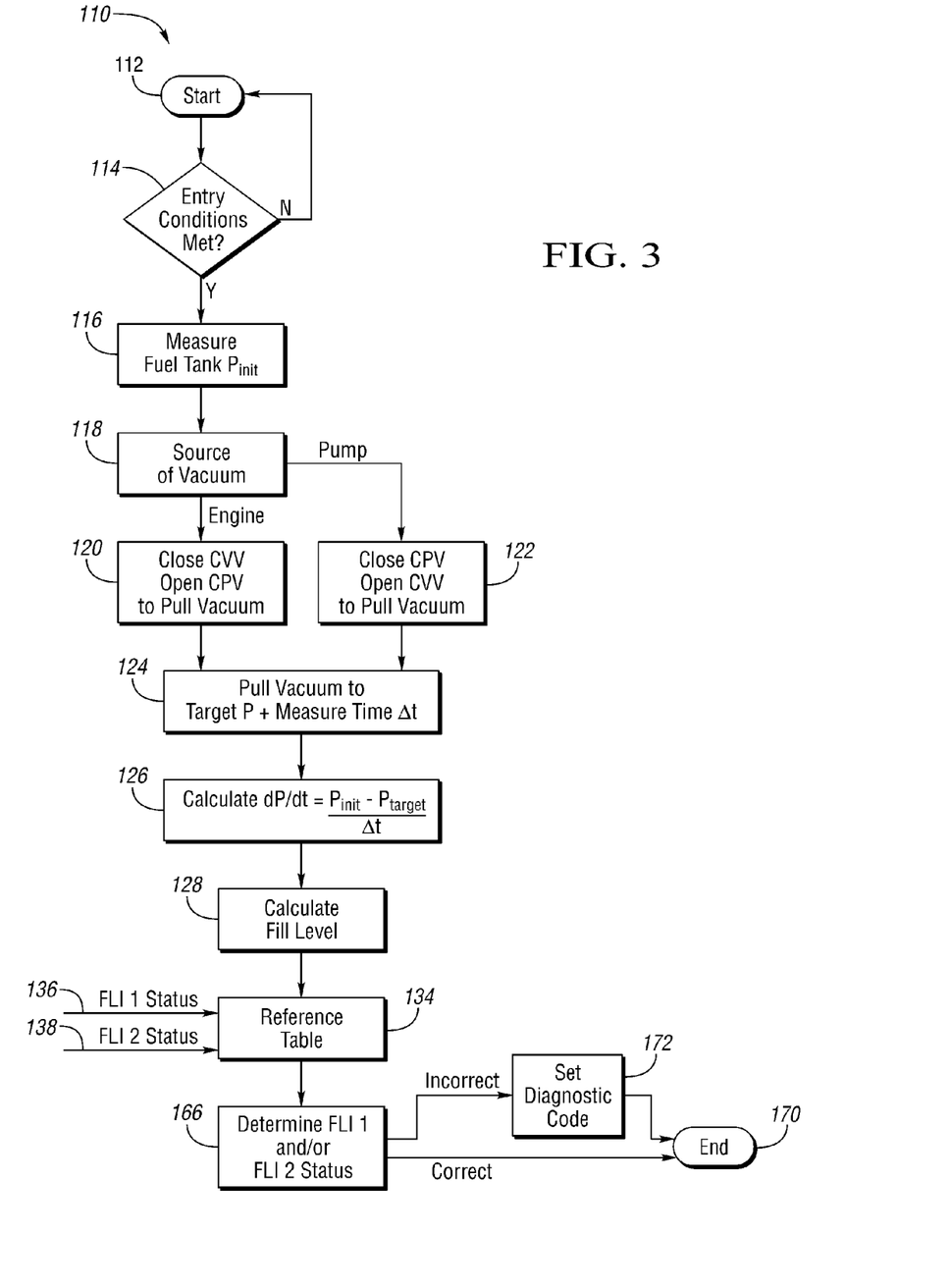
FIG. 3 illustrates a flow chart for a diagnostic for the fuel system according to an embodiment.

FIG. 3 illustrates an algorithm 110 for a fuel system diagnostic for the controller 66 to determine the functionality of one or both FLIs 52, 54. Various steps in the flow chart may be rearranged or omitted, and other steps may be added while remaining within the spirit and scope of the disclosure.

The algorithm 110 begins at 112. The controller 66 proceeds to 114 to determine if various entry conditions are met in order to run the diagnostic test. An entry condition at 114 may be a vehicle status, such as the vehicle entering a shut down state or a specified time after shut down, or the vehicle at a start up state. An entry condition may be based on the mileage since the last diagnostic test, for example, one hundred miles. An entry condition may be a set number of injector pulses in the engine 16 since the last diagnostic test, representing an amount of fuel used. An entry condition may be the vehicle operating in an extended idle condition, or another state where fuel slosh is at a minimum. An entry condition may be the vehicle operating in a hybrid mode with the engine 16 off. Entry conditions may include the ambient pressure and/or the ambient temperature being within a specified range. Another entry conditions may be an FLI indicating a constant fuel level for more than a predetermined time period. Other entry conditions are also contemplated for use with algorithm 110. The algorithm 110 may require one or more of the above listed entry conditions in order to run the diagnostic.

If the entry conditions at 114 are met, the controller 66 proceeds to block 116. At 116, the controller 66 measures the initial pressure, $P_{init}$, in the fuel tank 12 using pressure sensor 51. The controller 66 may also measure an ambient pressure using pressure sensor 70. In one embodiment, if the pressure sensor 51 is a gauge pressure sensor, the controller 66 may use the ambient pressure to determine the absolute pressure in the fuel tank 12.

The controller 66 then proceeds to block 118 to determine the source to use to pull the vacuum or reduce the pressure in the fuel tank 12. For a conventional vehicle, the vacuum source may be the engine 16, or alternatively, may be a vacuum pump 38 if the vehicle is so equipped. For a hybrid vehicle, the vacuum source may be the engine 16 or the vacuum pump 38. The engine 16 may act as the vacuum source as there is a low pressure, or vacuum, in the intake 34 and manifold when the engine 16 is operating. The controller 66 may therefore use the engine 16 as the vacuum source when it is operating. If the engine is not operating, the controller 66 may use the pump 38 as the vacuum source.

If the engine 16 is to be used as the vacuum source, the controller 66 proceeds from 118 to block 120. At 120 the controller configures the VPS 26 to pull a vacuum on the fuel tank 12 using the engine 16 as the vacuum source. The controller 66 commands the CVV 40 to a closed position. The controller 66 commands the CPV 42 and the FTIV 44 to open positions. The vacuum in the engine intake 34 may then draw a vacuum on the fuel tank 12.

If the pump 38 is to be used as the vacuum source, the controller 66 proceeds from 118 to block 122. At 122 the controller configures the VPS 26 to pull a vacuum on the fuel tank 12 using the pump 38 as the vacuum source. The controller 66 commands the CPV 42 to a closed position. Note that the CPV 42 is likely already in the closed position and therefore remains in the closed position. The controller 66 commands the CVV 40 and the FTIV 44 to open positions. The controller 66 then commands the pump 38 to operate to draw a vacuum on the fuel tank 12.

The algorithm 110 then proceeds to block 124 from either blocks 120 or 122. At 124, the controller 66 measures the time, $\Delta t$, for the pressure in the fuel tank 12 to decrease from the initial pressure, $P_{init}$, to a reference pressure, $P_{ref}$. The controller 66 may have an internal timer to measure elapsed time. The reference pressure is a predetermined pressure value that is below any expected value for pressure in the fuel tank 12. The controller 66 measures the pressure in the fuel tank 12 using data received from the pressure sensor 51. The controller 66 may also use data from the ambient pressure sensor 70 to convert gauge pressures into absolute pressures.

The controller 66 proceeds to block 126 where the change in pressure in the fuel tank 12 with respect to time is calculated. The controller takes the absolute value of the difference between the initial pressure in the fuel tank and the reference pressure, and then divides this difference by the change in time as shown by:

$$dP/dt = |P_{init} - P_{target}|/\Delta t.$$

The change in pressure over time relates to the volume of fuel in the fuel tank 12 as $dP/dt = f(Volume)$, where Volume is the volume of vapor in the fuel tank.

Figure 4:
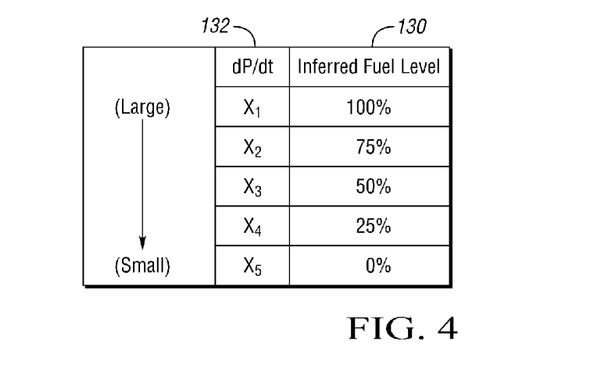
FIG. 4 illustrates a reference table for use with the diagnostic of FIG. 3.

The controller 66 then proceeds to 128 to calculate a fill level of the fuel tank 12 using a reference table, calibration table, or an algorithm. In one example, the controller refers to a table as shown in FIG. 4 to determine the fill level 130 of the fuel tank using dP/dt 132 as the input. The fill level is the estimated or inferred fuel level within the fuel tank based on the change in pressure with respect to time for a fuel system 10 having system integrity. For a full or mostly full fuel tank, there is little vapor in the tank, and the change in pressure over time will be high as there is little vapor to displace and the vacuum is pulled quickly to the reference pressure. A high rate of pressure change therefore may correspond with a high level of fuel within the fuel tank 10, or a high fill level. For an empty or mostly empty fuel tank, there is more vapor in the tank, and the change in pressure over time will be low as there is much vapor to displace and it takes more time to pull the vacuum in the fuel tank to the reference pressure. A low rate of pressure change may therefore correspond with a low level of fuel in the fuel tank 10, or a low fill level. If the fuel system 10, including the fuel tank 12 and/or the vapor system 26 does not have system integrity or has not been tested for system integrity, a large dP/dt may be indicative of a blockage in system 10 lines or a malfunctioning valve 44, 42, and the like; and a small dP/dt may be indicative of a lack of system integrity, malfunctioning valve 40, 42, and the like. Based on the resolution of the pressure sensor 51, the volume of the fuel tank 12 may be estimated to within a few gallons or better. In other embodiments, ambient conditions may be considered to include vapor generation to improve the accuracy of the results. A vapor generation analysis routine is based on the ideal gas law, PV=nRT, where the temperature and volume (of tank 12) are assumed to be constant during the duration of the test.

Figure 5:
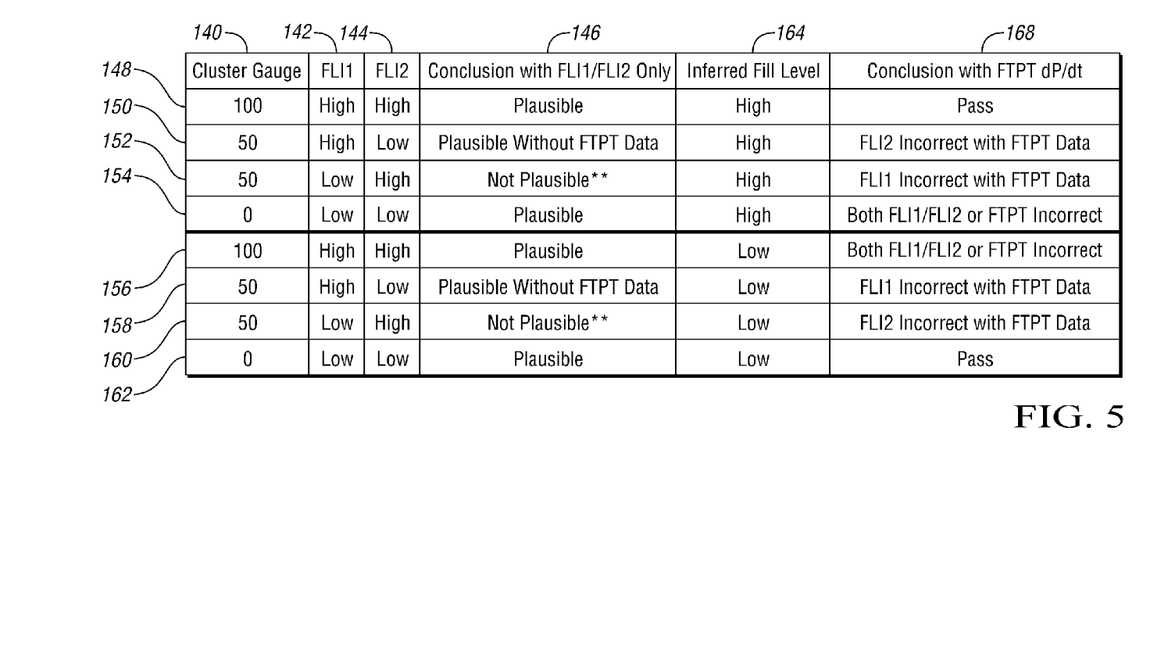
FIG. 5 illustrates another reference table for use with the diagnostic of FIG. 3.

Once the fill level is determined, the controller 66 proceeds to block 134 and compares the fill level to the status of the one or more FLIs 52, 54. The controller 66 may use a reference table or calibration table. In one example, the controller 66 refers to a reference table as shown in FIG. 5. The controller uses the status of FLI 52 as input 136, the status of FLI 54 as input 138, and the fill level as calculated at 128. The status of an FLI is the fuel level that the FLI is signaling that it is measuring, or in other words is the position of the FLI within the fuel tank. When an FLI is not functioning properly, the FLI may signal an incorrect fuel level in the fuel tank as the position of the FLI may differ from the actual liquid level. For example, an FLI may become stuck in a fixed position such that the position of the FLI does not change as the fuel level changes. Alternatively, the FLI position may not change if the fuel in the fuel tank is within the ullage region or empty region. In one example, the FLI position may not change for an extended period of time when the fuel level is within the ullage region, and the user keeps filling or topping off the fuel tank before the fuel level drops below the ullage region. It may be desirable to determine that FLI is operating properly and functioning, as the measurable fuel level is not changing.

Referring to FIG. 5, an example of a portion of a reference table for use with block 134 is shown. Of course, other reference tables may be used, including ones that are configured for single tank fuel systems, fuel systems having pressure sensors with higher resolution, and the like.

The reference table in FIG. 5 illustrates the reading on the fuel level gauge in the instrument panel as column 140. For the non-limiting example as shown, the gauge 140 is either zero, half full, or full. The status of FLI 52 is illustrated in column 142 and the status of FLI 54 is illustrated in column 144. In the example shown, the FLI status may be either high or low. A high FLI status means that the FLI is sending a signal corresponding to a position at its full level 58. A low status means that the FLI is sending a signal corresponding to a position at its empty level 56.

Column 146 presents whether the FLI status is plausible based on the FLI status alone. For example, in line 148, FLI 52 is high, FLI 54 is high, and the gauge reading is for 100, or full, which is plausible. In line 150, FLI 52 is high, FLI 54 is low, and the gauge reading is 50 or half, which is also plausible due to the fact that if the tank 12 is half full, the FLI 52 on the active side 18 would read high while the FLI 54 on the passive side 20 would read low because of the jet pump operation. In line 152, FLI 52 is low, FLI 54 is high, and the gauge reading is 50 or half, which is not plausible due to the fact that if the tank 12 is half full, the FLI 52 on the active side 18 would read high while the FLI 54 on the passive side 20 would read low. In line 154, FLI 52 is low, FLI 54 is low, and the gauge reading is zero, or empty, which is plausible. Similar logic may be applied to reach the conclusion for column 146 with respect to lines 156-162.

Column 164 in FIG. 5 provides a series of fill levels. For a high fill level, the inferred fuel level in the fuel tank is above 75% full as determined using the table in FIG. 4. For a low fill level, the inferred fuel level in the tank is below 25% full as determined using the table in FIG. 4. In other embodiments, the inferred fuel level may correspond to other percentage fuel levels in the fuel tank 12.

The algorithm 110 at block 136 in FIG. 3 uses the reference table as shown in FIG. 5 to determine the functionality of FLI 52 and/or FLI 54. The determination as found in block 166 is illustrated with respect to column 168 in FIG. 5. For example, in line 148, FLI 52 and FLI 54 are high, and the inferred fuel level is high leading to the conclusion that the FLIs 52, 54 are operating and functioning correctly. In line 150, FLI 52 is high, FLI 54 is low, and the inferred fuel level is high leading to the conclusion that FLI 54 in the passive side 20 is not operating and functioning correctly as it should be providing a high signal. In line 152, FLI 52 is low, FLI 54 is high, and the inferred fuel level is high leading to the conclusion that FLI 52 in the active side 18 is not operating and functioning correctly as it should be providing a high signal. In line 154, FLI 52 is low, FLI 54 is low, and the inferred fuel level is high leading to the conclusion either the inferred fuel level is incorrect or both FLIs 52, 54 are not operating and functioning correctly as they should be providing a high signal. Similar logic may be applied to reach the conclusion for column 146 with respect to lines 156-162.

If the controller 66 determines from the reference table at 166 that the FLIs 52, 54 are operating and functioning correctly, the algorithm 110 proceeds to block 170 and ends.

If the controller 66 determines from the reference table at 166 that FLI 52 and/or FLI 54 is not operating and functioning correctly or if there has potentially been an error with the inferred fill level measurement, the algorithm 110 proceeds to block 172 and sets a diagnostic code or flag, or a service code. The diagnostic code may be set or stored temporarily or permanently in the controller 66.

Figure 6:
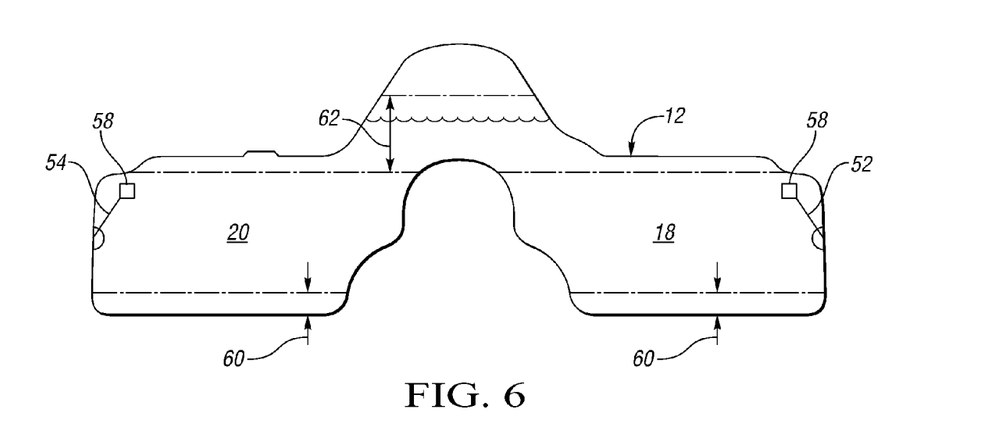
FIG. 6 illustrates a fuel tank for use with the diagnostic of FIG. 3 according to an example.

FIG. 6 illustrates an example of fuel tank 12 as a simplified schematic. The fuel level in the fuel tank is within the ullage region 62. The FLI 52 in the active side 18 is at its full position 58. The FLI 54 in the passive side 20 is at its full position 58. A pressure test of the fuel tank 12 results in a high dP/dt, which corresponds with a high inferred fuel level, as illustrated. When the controller 66 uses the reference table as illustrated in FIG. 5 at block 134 and 136, the FLIs 52, 54 are determined to be functioning and operating properly as their signaled positions correlate to the amount of fuel in the fuel tank 12, as shown in line 148.

As can also be seen in FIG. 6, if fuel is used from the fuel tank 12, or fuel is added to fuel tank 12, the position of the FLIs 52, 54 will not change until the fuel level decreases to below the ullage region. Therefore, the diagnostic allows for the determination of whether a FLI is functioning properly when the fuel level indicated by the FLI(s) is not changing.

Figure 7:
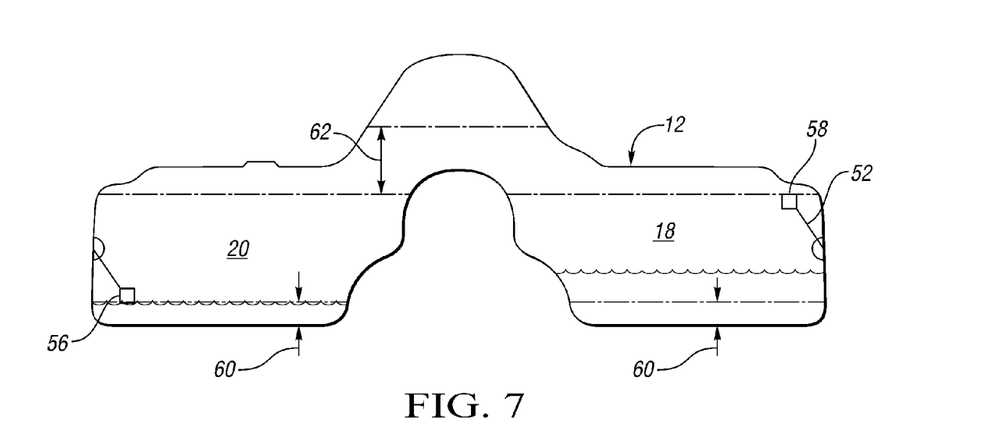
FIG. 7 illustrates a fuel tank for use with the diagnostic of FIG. 3 according to another example.

FIG. 7 illustrates another example of fuel tank 12 as a simplified schematic. The fuel level in the fuel tank is low with the fuel in the passive side 20 in the empty region 60, and the fuel in the active side 18 just above the empty region 60. The FLI 52 in the active side 18 is at its full position 58. The FLI 54 in the passive side 20 is at its empty position 56. A pressure test of the fuel tank 12 results in a low dP/dt, which corresponds with a low inferred fuel level, as illustrated. When the controller 66 uses the reference table as illustrated in FIG. 5 at block 134 and 136, the FLI 52 is determined to be not functioning or operating properly as its signaled position does not correlate to the amount of fuel in the fuel tank 12, as shown in line 158. The controller 66 sets a diagnostic code at block 172 of algorithm 110.

Various embodiments have associated, non-limiting advantages. For example, pressure testing the fuel tank to correlate a rate of pressure change within the fuel tank to a fuel level within the tank allows for a diagnostic to determine whether a fuel level indicator within the fuel tank is functional. The diagnostic may be used at any fill level of fuel in the fuel tank. When the fill level of fuel in the fuel tank is within a ullage region or an empty region when the FLI positions are at their respective limits, the diagnostic may determine if the FLI(s) are functioning properly when there is no change in measured fuel level by the FLI(s).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments that are not explicitly illustrated or described. Where one or more embodiments have been described as providing advantages or being preferred over other embodiments and/or over prior art with respect to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. As such, any embodiments described as being less desirable relative to other embodiments with respect to one or more characteristics are not outside the scope of the claimed subject matter.

What is claimed is:

1. A vehicle comprising:
   an engine;
   a fuel system for the engine having a fuel tank, a first fuel level indicator (FLI), a vent valve connecting the fuel tank to atmosphere, a purge valve connecting the fuel tank to an engine intake, and a pressure sensor; and
   a controller configured to: (i) pull a vacuum on the fuel tank from an initial pressure to a reference pressure to determine a rate of pressure change in the fuel tank, (ii) command the vent valve to a closed position, command the purge valve to an open position, and operate the engine to pull the vacuum on the fuel tank, (iii) inferring a fuel level using a correlation with the rate of pressure change in the tank, and (v) provide a diagnostic code based on a comparison of a fuel level indicated by the first FLI to the inferred fuel level.

2. The vehicle of claim 1 wherein the fuel system further comprises a pump positioned between the vent valve and the fuel tank;
   wherein the controller is further configured to command the purge valve to a closed position, command the vent valve to an open position, and operate the pump to pull the vacuum on the fuel tank.

3. A vehicle comprising:
   a fuel system having a saddle fuel tank having active and passive sides with first and second fuel level indicators (FLI), respectively, and a tank pressure sensor; and
   a controller configured to: pull a vacuum on the tank from an initial pressure to a reference pressure to determine a rate of tank pressure change, compare a fuel level indicated by the first FLI to the rate, and provide a diagnostic code.

4. The vehicle of claim 3 wherein the controller is further configured to provide an inferred fuel level using the rate of tank pressure change, and provide the diagnostic code in response to (i) comparing the fuel level indicated by the first FLI to the inferred fuel level and (ii) comparing another fuel level indicated by the second FLI to the inferred fuel level.

5. The vehicle of claim 4 wherein the controller provides the diagnostic code in response to a low level in the first FLI, a high level in the second FLI, and a low inferred fuel level.

6. The vehicle of claim 4 wherein the controller provides the diagnostic code in response to a high level in the first FLI, a low level in the second FLI, and a low inferred fuel level.

7. The vehicle of claim 4 wherein the controller provides the diagnostic code in response to a high level in the first FLI, a low level in the second FLI, and a high inferred fuel level.

8. The vehicle of claim 4 wherein the controller provides the diagnostic code in response to a low level in the first FLI, a low level in the second FLI, and a high inferred fuel level.

9. The vehicle of claim 4 wherein the controller provides the diagnostic code in response to a high level in the first FLI, a high level in the second FLI, and a low inferred fuel level.

10. The vehicle of claim 4 wherein the controller provides the diagnostic code in response to a low level in the first FLI, a high level in the second FLI, and a high inferred fuel level.

11. The vehicle of claim 10 wherein the controller is further configured to pull the vacuum in-on the fuel-tank in response to the fuel level indicated by the first FLI remaining generally constant for a predetermined time period while the vehicle is operating.

12. A method for performing a fuel level indicator (FLI) diagnostic for a vehicle, comprising:
    pulling a vacuum on a fuel tank from an initial pressure to a reference pressure to determine a rate of tank pressure change;
    inferring a fuel level using a correlation with the rate;
    comparing a fuel level indicated by a first FLI to the inferred fuel level;
    comparing another fuel level indicated by a second FLI to the inferred fuel level; and
    providing a diagnostic code based on the comparisons.

13. The method of claim 12 wherein the vacuum is pulled in response to satisfying an entry condition.

14. The method of claim 13 wherein the entry condition is a vehicle shut down event.

15. The method of claim 13 wherein the entry condition is an engine off state in a hybrid vehicle.

16. The method of claim 13 wherein the entry condition is the fuel level indicated by the FLI remaining generally constant for a predetermined time period while the vehicle is operating.

* * * * *